United States Patent [19]
Duchateau

[11] Patent Number: 5,915,779
[45] Date of Patent: Jun. 29, 1999

[54] VEHICLE SEAT ANCHORING SYSTEM

[75] Inventor: Jean Duchateau, Burgos, Spain

[73] Assignee: Irausa Ingenieria, S.A., Spain

[21] Appl. No.: 08/769,234

[22] Filed: Dec. 18, 1996

[30] Foreign Application Priority Data

Dec. 19, 1995 [ES] Spain ..................................... 9502485

[51] Int. Cl.$^6$ ...................................................... B60N 2/10
[52] U.S. Cl. ................. 296/65.16; 296/68.1; 296/65.09; 297/336
[58] Field of Search ............................... 296/65.01, 68.1, 296/65.09, 65.16; 297/216.1, 378.1, 378.12, 378.13, 378.14, 336, 335

*Primary Examiner*—D. Glenn Dayoan
*Assistant Examiner*—Jason Morrow
*Attorney, Agent, or Firm*—Schweitzer Cornman Gross & Bondell LLP

[57] ABSTRACT

An anchoring system for the seat of a vehicular seat adapted to be rotated between folded and upright positions, having a front anchor bar and a rear anchor bar, both being attached to the floor of the vehicle, the leg having a leg and having front and rear projections for anchoring the seat from the front and rear anchor bars, a profile formed on the bottom of the leg between the first and second projections for an anchor bar sliding in engagement therewith when the seat is moved from its folded position to its upright position, a recess between the first projection and the profile for selective engagement with the rear anchor bar, a catch having a hook for engaging the rear anchor bar, and a support member having two recesses each for fitting at all times about a respective one of the front and said rear anchor bars, in its upright position the seat is being held firm by the anchoring system regardless of the position of the catch.

6 Claims, 2 Drawing Sheets

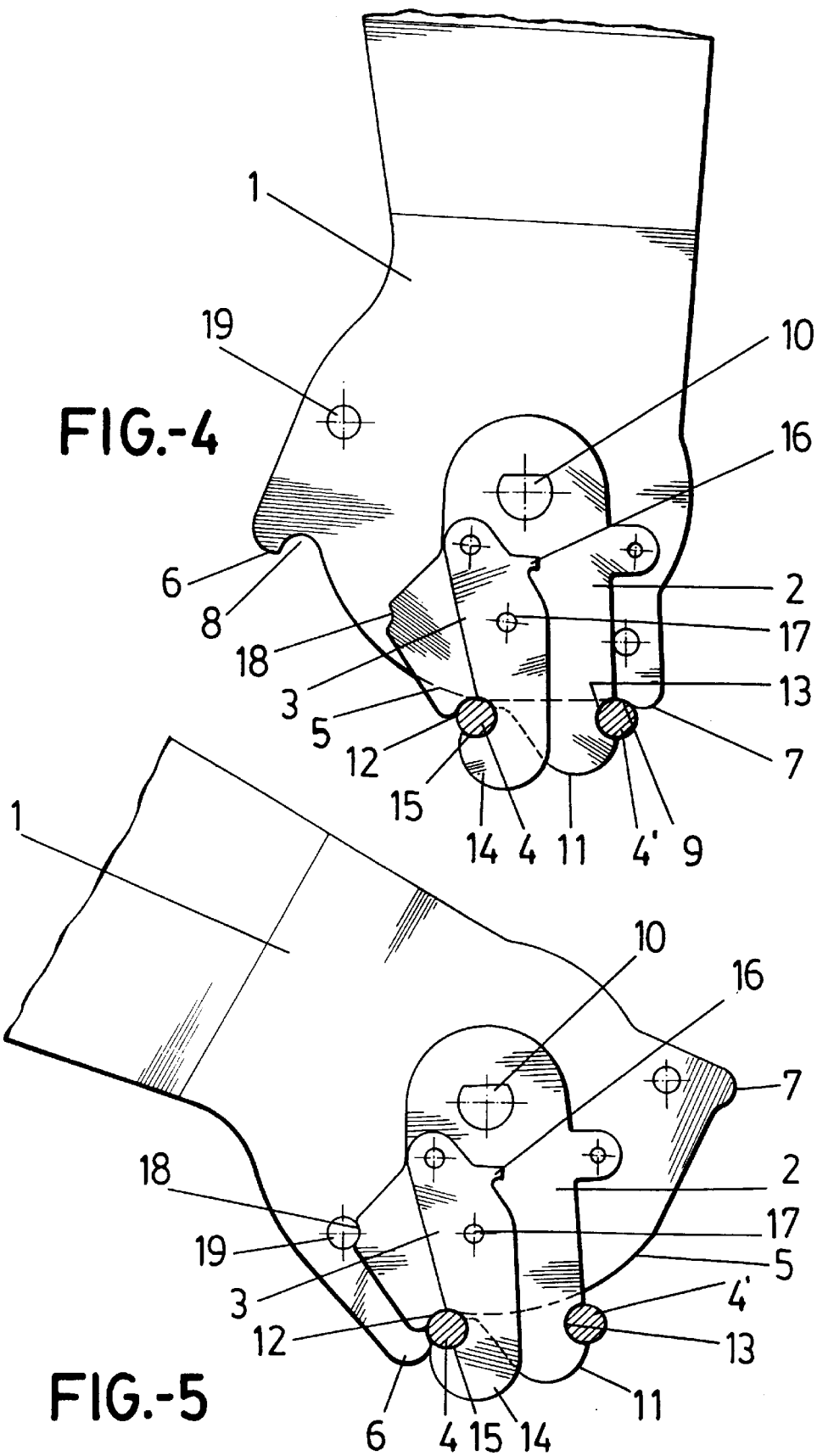

VEHICLE SEAT ANCHORING SYSTEM

FIELD OF THE INVENTION

The present invention relates to a foldable vehicular seat anchoring system which holds the seat stable in both its upright and forwardly folded position, eliminating any noise, loose play, and avoids accidents to passengers seated behind.

BACKGROUND

A vehicular seat coupling is described in European patent No. 9,2403,299 which discloses a vehicle seat having a mechanism to attach the seat to the floor, which has a latch with a protrusion movably mounted from the seat, for insertion in an opening in the floor. When unlocked the latch can intrude into or be withdrawn from the opening, and when locked the latch protrusion is supported on and locked under an edge of the opening. A drawback of this prior art structure is that the locking latch is the member that attaches the seat to the floor when in use and it must therefore endure all the stresses generated on the seat.

Another device, described in European patent No. 9,302,490, is a system for quick mounting/dismounting of seats or other accessories having two bolts interlocked by articulation. Each bolt extends into a catch and when an actuating handle is pulled upwardly the respective catches retract and can cross a window in a base plate that is attachable to the floor, and when the handle is pushed down, the respective catches move away from each other and are locked against the underside of the platform.

The drawback of these known mechanisms is that when the latch or latches are not in the locked position, the seat is not attached to the floor and can be removed from its position, moreover the seat will not be anchored and serious accidents can occur when the latch is accidentally actuated while the vehicle is moving.

Since the anchoring of the seat in the known structures is carried out with movable parts, there is frequently a play between them, resulting in annoying noises in a moving vehicle.

DESCRIPTION OF THE INVENTION

The present invention completely eliminates the drawbacks of the known devices by providing an anchoring system that permits the seat to be kept in a fixed position when in use without any moving parts such as bolts or latches thus eliminating the customary noises and play between loose parts. The system of the present invention also allows the seat to be kept in a stable position when it is folded or tilted, thus avoiding any accidental damage to passengers seated behind.

The seat of the anchoring system of the present invention is attached to two anchoring bars provided for that purpose on the floor of the vehicle, with the leg of the seat, a support member and a catch contributing to the anchoring to those bars.

The leg of the seat is provided at its lower end with a profile that allows the leg to be supported at all times on the anchor bars, each side of the lower end of the leg being provided with projections which contribute to the support of the seat in its two lockable positions, i.e. in its upright position or when folded in its tilted position.

The support member has a pair of recesses designed to be fitted on the anchor bars that are attached to the floor. The support member is releasably attached by its recess to the leg of the seat and when thus attached to the anchor bars the support member cannot move, but the leg of the seat can however turn relative to the same.

The catch can be fitted on the rear anchor bar, and is linked to the support member by a spring that maintains the relative position between both parts at all times.

These three parts allow the seat to be kept fixed in any position, wherein the manner in which the seat is supported on the anchor bars and the parts involved are different in each position.

When the seat is in its upright position, the seat is supported on the bars with the assistance of the leg of the seat, which prevents a backward movement of the seat, and the support member, which prevents an upward and forward movement. Once the seat is fixed in its position, the catch member prevents the seat from turning backward, avoiding possible accidents to passengers seated behind. This is achieved by the aforementioned spring between the catch and the support member, which causes both parts to be biased at all times and pressed against the supporting bars, and thus the bias of that spring must be overcome to remove the seat. This is also the reason for no noises nor play occurring between the parts involved in the anchorage.

In the upright or operative position of the seat, i.e. when the seat is ready to be sat on, the leg of the seat prevents an upward or forward movement of the seat, whereas the support member prevents an upward, forward and backward movement, with the leg of the seat having a stop that abuts against the support member which remains fixed, once the seat reaches the operative position, thus preventing the leg of the seat from travelling beyond such position.

In accordance with the described structure of the present invention, the seat operates so that when the seat is positioned upright on the anchoring bars the grooves of the support member and catch are applied onto the anchor bars. In this position the seat is fixed, and cannot be removed without actuating the catch with its actuating lever, which involves pivoting the catch until its recessed portion is released from the anchoring bar. The upright position is stable unless the catch is actuated, because the coil spring arranged between both members holds them tightly against the bars at all times, for preventing their detachment from their anchoring position and the seat from falling backward due to its own weight.

In order for the seat to be folded, sufficient force must be exerted to overcome the bias of the coil spring. This force causes the leg of the seat to slide on the anchoring bars until the stop on the leg of the seat abuts against the support member and the front anchor bar is nested in a recess next to a hook-shaped protrusion in the leg. In this position, the seat is fixed by means of the support member and the leg of the seat, and the catch is not involved in the anchoring. This prevents any accidents due to the seat becoming detached due to faulty or accidental manipulations of the catch.

The seat can be removed by moving it to its folded position and then actuating the catch by the actuating lever to release it from its anchorage on the rear bar.

DESCRIPTION OF THE DRAWING

The invention is explained in greater detail with reference to the drawing, wherein:

FIG. 4 is an elevational view of the support member, the catch and the leg of the seat with respect to the anchor bars with the seat in its folded position; and FIG. 5 is an elevational view of the support member, the catch and the leg of the seat with respect to the anchor bars with the seat in its upright position.

DETAILED DESCRIPTION

Figure 1:
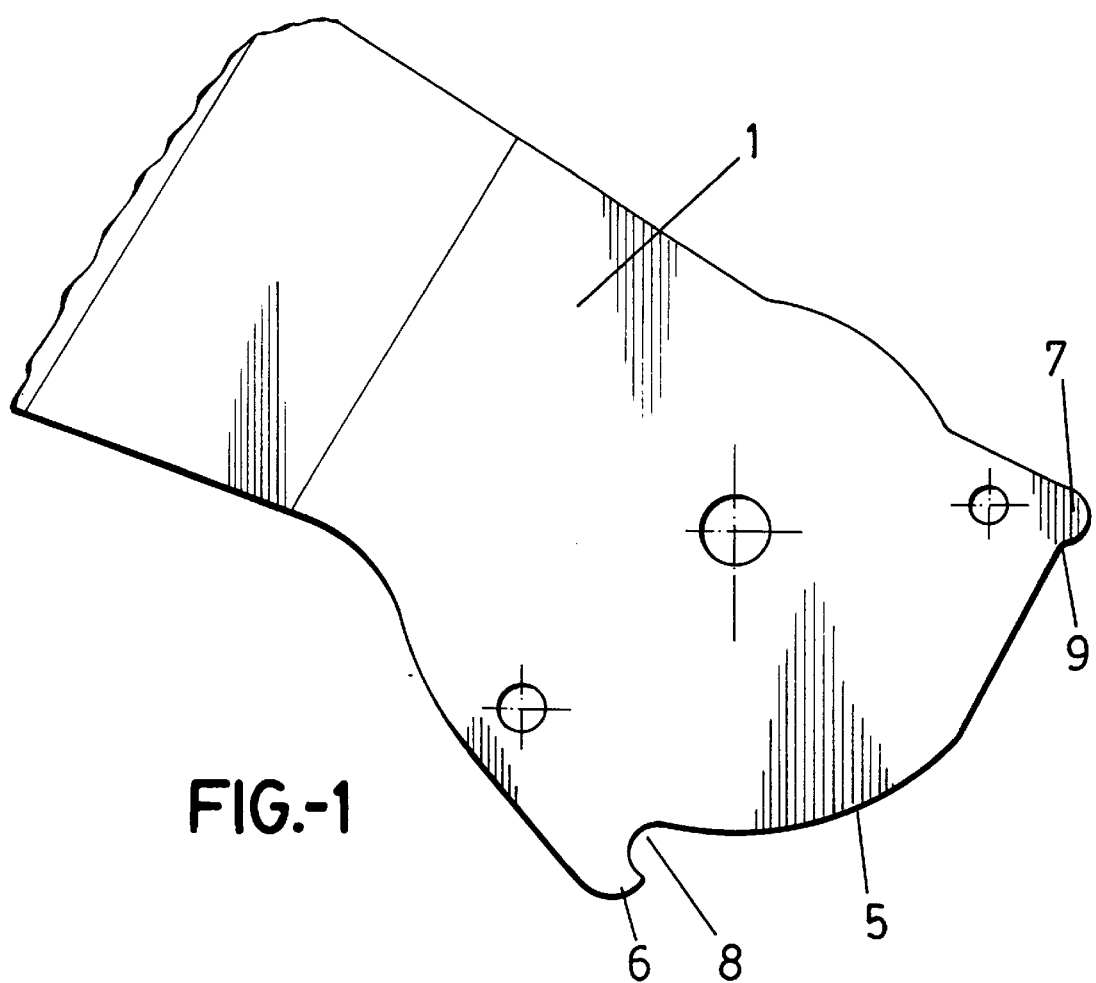
FIG. 1 is an elevational view of the lower anchoring end of the leg of the seat in an upright position.
Figure 2:
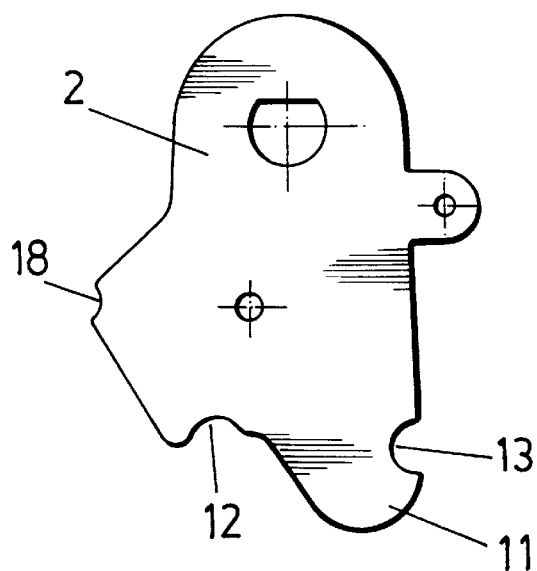
FIG. 2 is an elevational view of the support member.
Figure 3:
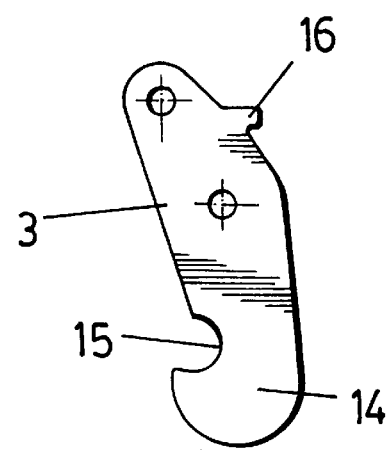
FIG. 3 is an elevational view of the catch.
Figure 1:
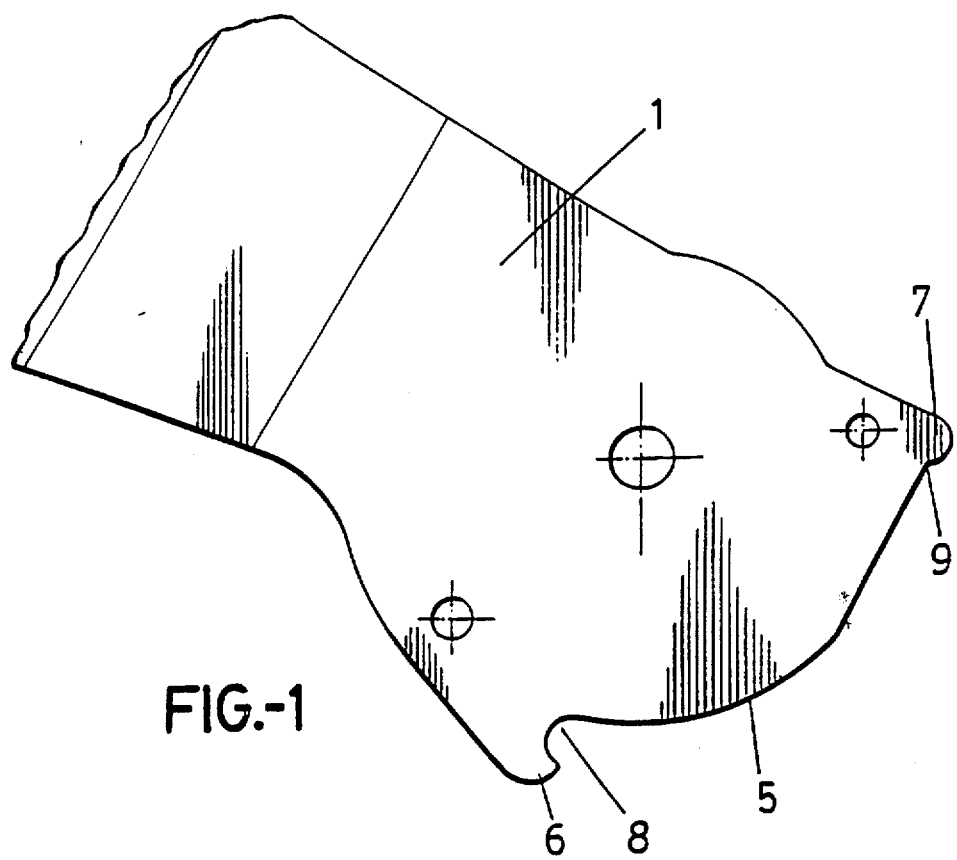
Figure 2:
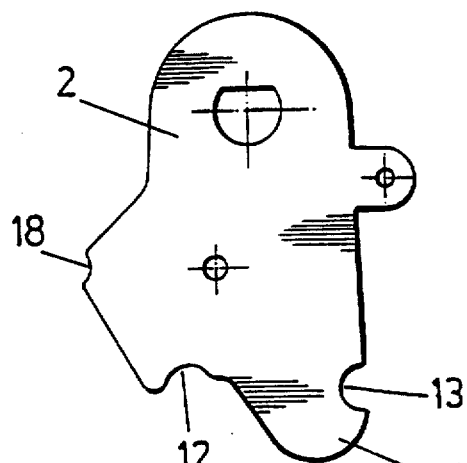
Figure 3:
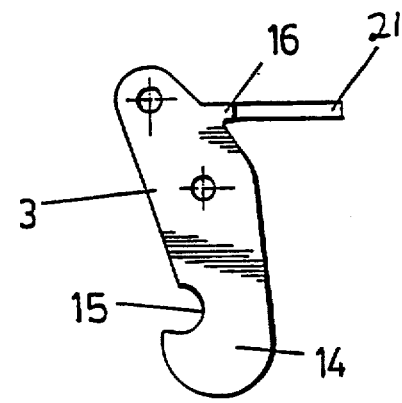

Referring to FIGS. 1–5, in the system of the present invention the seat is anchored by the combined action of the leg 1 of the seat, a support member 2 and a catch 3 that are fitted on a transverse front anchor bar 4 and a transverse rear anchor bar 4', both suitably located in a hole of the supporting surface or the floor of the vehicle. Although not shown in FIGS. 4 or 5, it can be appreciated that the front and rear anchor bars 4, 4' are fixedly attached to the vehicle.

The leg 1 has at its lower ends two projections 6 and 7, the projection 6 forms a recessed portion 8, and the projection 7 forms a recess 9, each for accommodating one of the anchor bars 4' and 4, respectively, thereby delimiting the maximum permissible travel of the leg to the respective folded and upright positions of the seat. A curved profile 5 extends between the recesses 8 and 9 for insuring contact with the anchor bars 4 and 4' during transition of the leg between the two extreme positions of the seat.

The support member 2 is connected to the leg 1 through a pin 10 that allows them to turn about each other. The support member 2 suitably has a bottom projection 11 for entering a hole in the supporting surface of the seat (not shown) and is supported and fitted on the anchor bars 4 and 4' by two grooves or recesses 12 and 13 of approximately semicircular shape. A rearward facing recess 18 on the support member 2 is adapted to be occupied by a locking pin 19 on the surface of the leg 1, to limit any displacement of the seat from its upright position.

The catch 3 is provided with a hook-shaped extension or projection 14 defining a recess 15 designed to fit on the rear anchor bar 4'. A small extending portion 16 is provided on the upper part of the catch 3, for actuation by an actuating lever 21 that causes the catch 3 to pivot about a pin 17, for releasing the connection between the recess 15 and the rear anchor bar 4'.

A coil spring 20 arranged between the support member 2 and the catch 3, continuously presses the projection 14 of the catch against the rear anchor bar 4', while the bottom projection 11 of the support member is pressed against the front anchor bar 4, thereby ensuring a close fit between the parts and the anchor bars and thus eliminating loose play between the seat parts and thus also attendant noise such as rattles.

The seat in folded position is attached to the anchor bars that provide anchorage to the floor by the leg 1, support member 2, and the catch 3. The recess 13 of the support member 2 in conjunction with the opposed leg projection 7 fit about the front anchor bar 4 and this prevents upward and forward movement of the seat, while the recess 15 of the catch 3, with the recess 12 of the support member 2 fit about the rear anchor bar 4' to prevent upward and backward movement of the seat.

The catch 3 serves no function when the seat is in the upright position, thereby avoiding the possibility of the seat being released by accidental actuation of the catch releasing lever 21. Fixing of the seat in this position is insured by the support member 2 and the leg 1 of the seat. In particular, the anchoring of the upright seat is achieved by fitting the recessed portion 8 of the projection 6 of the leg 1 and the groove 12 of the support member 2 on the rear anchor bar 4', and anchoring on the front anchor bar 4 is achieved by the groove 13 of the support member 2 engaging the front anchor bar 4.

Transition between both positions is achieved by pushing the seat with sufficient strength to overcome the bias of the coil spring (not shown) that tends to keep the seat upright, which causes the seat to disengage and pivot forward with the curved profile 5 of the leg 1 sliding on the anchor bars 4 and 4' as the seat is being pivoted, until the lower projection 7 on the leg abuts against the forward anchor bar 4', preventing a further pivoting of the leg about the pin 10.

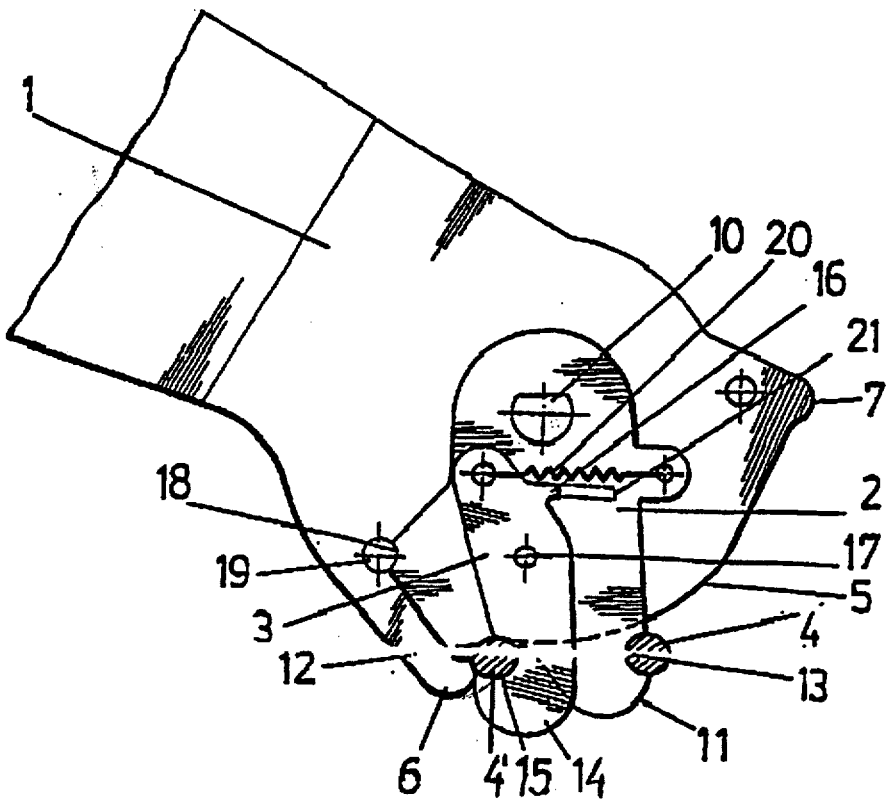

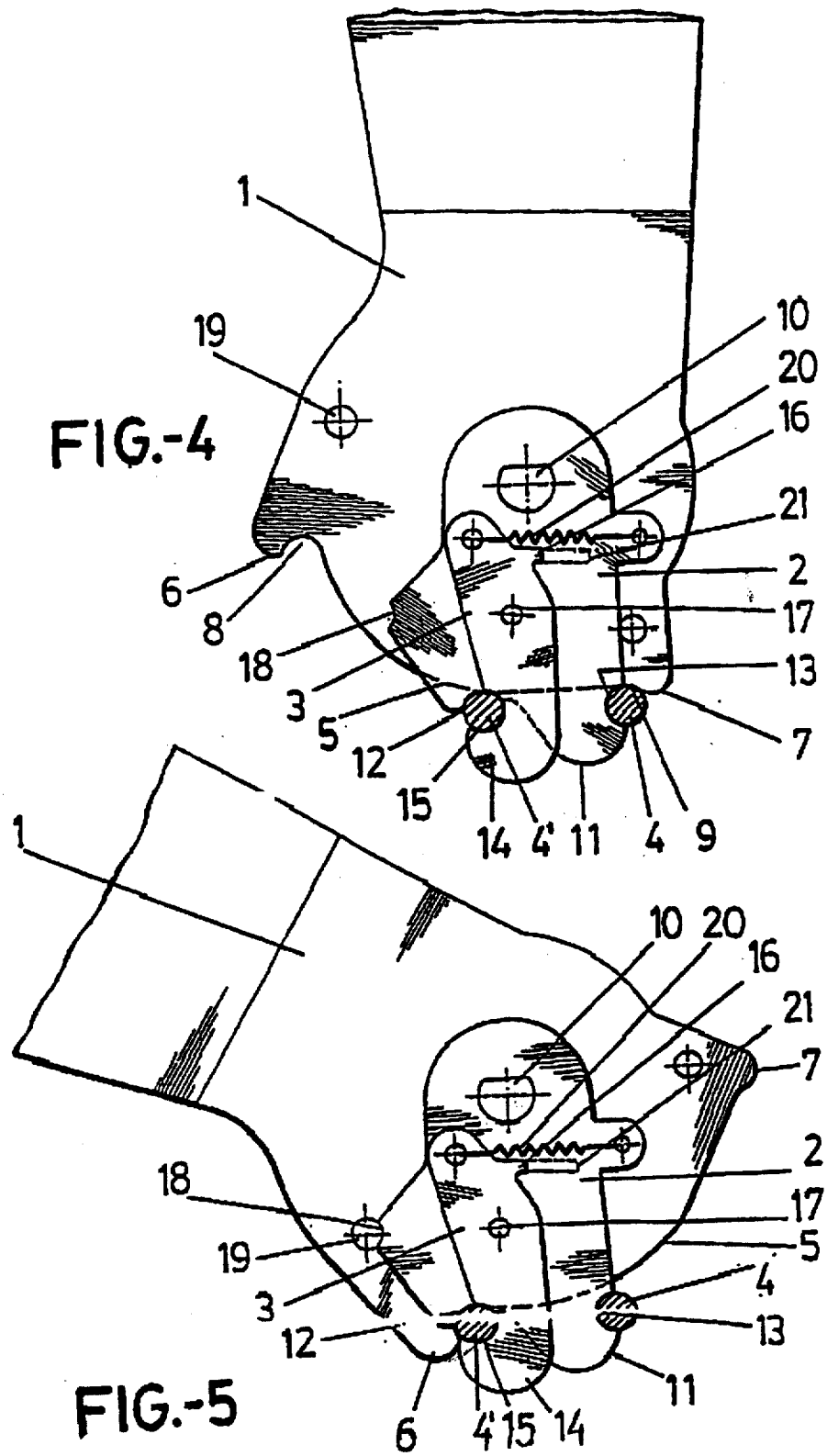

I claim:

1. An anchoring system for a vehicular seat having a folded position and an upright position, comprising
   (i) a front anchor bar and a rear anchor bar said anchor bars being attached to of the vehicle;
   (ii) a leg of the seat, said leg having (a) front and rear projections for anchoring said seat to said front and from said rear anchor bars, (b) a profile formed on the bottom of said leg between said front and rear projections for an anchor bar sliding in engagement therewith when the seat is moved between said folded position to said upright position, and (c) a recess between said first projection and said profile for selective engagement with said rear anchor bar,
   (iii) a catch for releasing the seat, said catch having a hook for engaging said rear anchor bar, and
   (iv) a support member having a front recess and a rear recess each for fitting at all times about a respective one of said front and said rear anchor bars,
in its upright position the seat being securely attached to the vehicle by the anchoring system irrespective of the position of said catch.

2. The anchoring system of claim 1, wherein said catch includes a lever operable to turn said catch about said pivot pin for disengaging said hook from said rear anchor bar for removal of the seat when the seat is folded.

3. The anchoring system of claim 1, wherein said profile of said leg is curved at the lowermost end of said leg for maintaining contact with said anchor bars and for facilitating the movement of the seat between its folded and upright positions.

4. The anchoring system of claim 1, wherein said support member further comprises a forward projecting recess, and a locking pin attached to a surface of the leg, said locking pin engaging said forward projecting recess to prevent displacement of the seat from its upright position.

5. The anchoring system of claim 1, further comprising a spring for maintaining said support member in a fixed position on said anchor bars regardless of the position of said leg.

6. The anchoring system of claim 1, wherein said forward recess of the support member has an approximately semi-circular shape for closely fitting about said forward anchor bar for preventing upward and forward movement of the seat in its upright position.

* * * * *

UNITED STATES PATENT AND TRADEMARK OFFICE
CERTIFICATE OF CORRECTION

PATENT NO. : 5,915,779
DATED : June 29, 1999
INVENTOR(S) : Jean Duchateau

It is certified that error appears in the above-identified patent and that said Letters Patent is hereby corrected as shown below:

The title page, showing the illustrative figure, should be deleted and substitute therefor the attached title page.

Drawing sheet, consisting of Figs. 1-5, should be deleted to be replaced with the drawing sheets, consisting of Figs 1-5, as shown on the attached page.

Signed and Sealed this

Twenty-first Day of March, 2000

Attest:

Q. TODD DICKINSON

Attesting Officer

*Commissioner of Patents and Trademarks*

United States Patent [19]
Duchateau

[11] Patent Number: 5,915,779
[45] Date of Patent: Jun. 29, 1999

[54] VEHICLE SEAT ANCHORING SYSTEM

[75] Inventor: Jean Duchateau, Burgos, Spain

[73] Assignee: Irausa Ingenieria, S.A., Spain

[21] Appl. No.: 08/769,234

[22] Filed: Dec. 18, 1996

[30] Foreign Application Priority Data

Dec. 19, 1995 [ES] Spain ............................ 9502485

[51] Int. Cl.$^6$ .................................................... B60N 2/10
[52] U.S. Cl. ................. 296/65.16; 296/68.1; 296/65.09; 297/336
[58] Field of Search ........................ 296/65.01, 68.1, 296/65.09, 65.16; 297/216.1, 378.1, 378.12, 378.13, 378.14, 336, 335

*Primary Examiner*—D. Glenn Dayoan
*Assistant Examiner*—Jason Morrow
*Attorney, Agent, or Firm*—Schweitzer Cornman Gross & Bondell LLP

[57] ABSTRACT

An anchoring system for the seat of a vehicular seat adapted to be rotated between folded and upright positions, having a front anchor bar and a rear anchor bar, both being attached to the floor of the vehicle, the leg having a leg and having front and rear projections for anchoring the seat from the front and rear anchor bars, a profile formed on the bottom of the leg between the first and second projections for an anchor bar sliding in engagement therewith when the seat is moved from its folded position to its upright position, a recess between the first projection and the profile for selective engagement with the rear anchor bar, a catch having a hook for engaging the rear anchor bar, and a support member having two recesses each for fitting at all times about a respective one of the front and said rear anchor bars, in its upright position the seat is being held firm by the anchoring system regardless of the position of the catch.

6 Claims, 2 Drawing Sheets